Jan. 29, 1957  G. M. DAVIDSON  2,779,922
TRANSISTOR TEST SET
Filed July 20, 1953  3 Sheets-Sheet 1
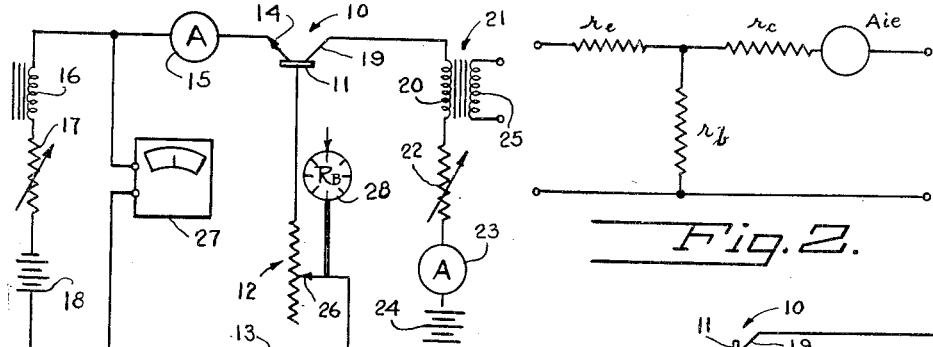
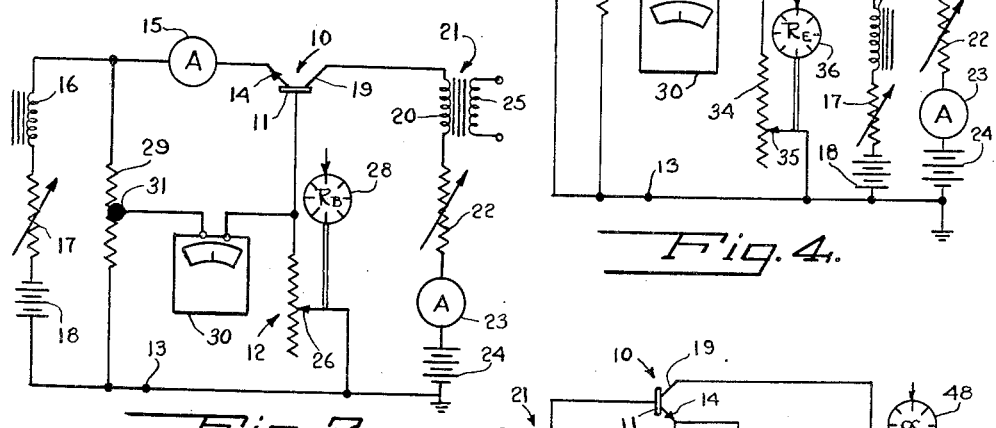
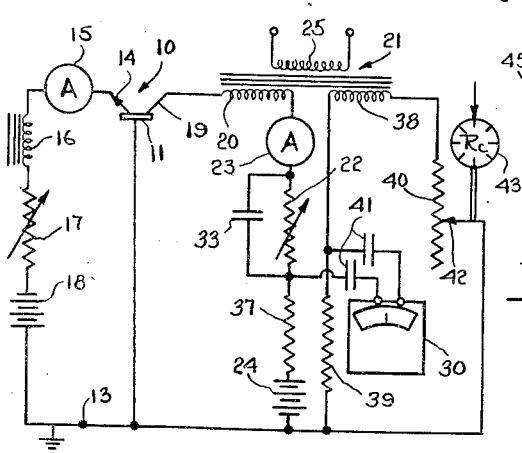
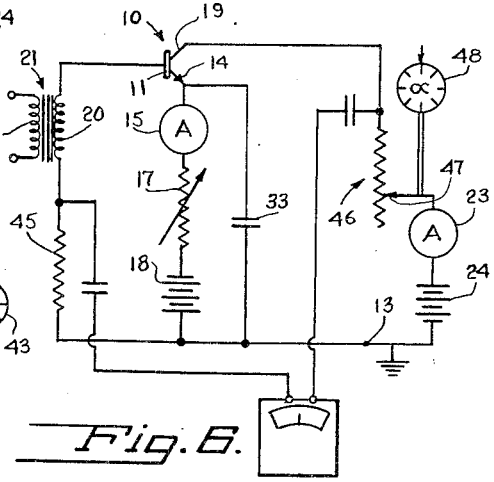
INVENTOR.
GARETH M. DAVIDSON
BY
*Raymond A. Paquin*
ATTORNEY.

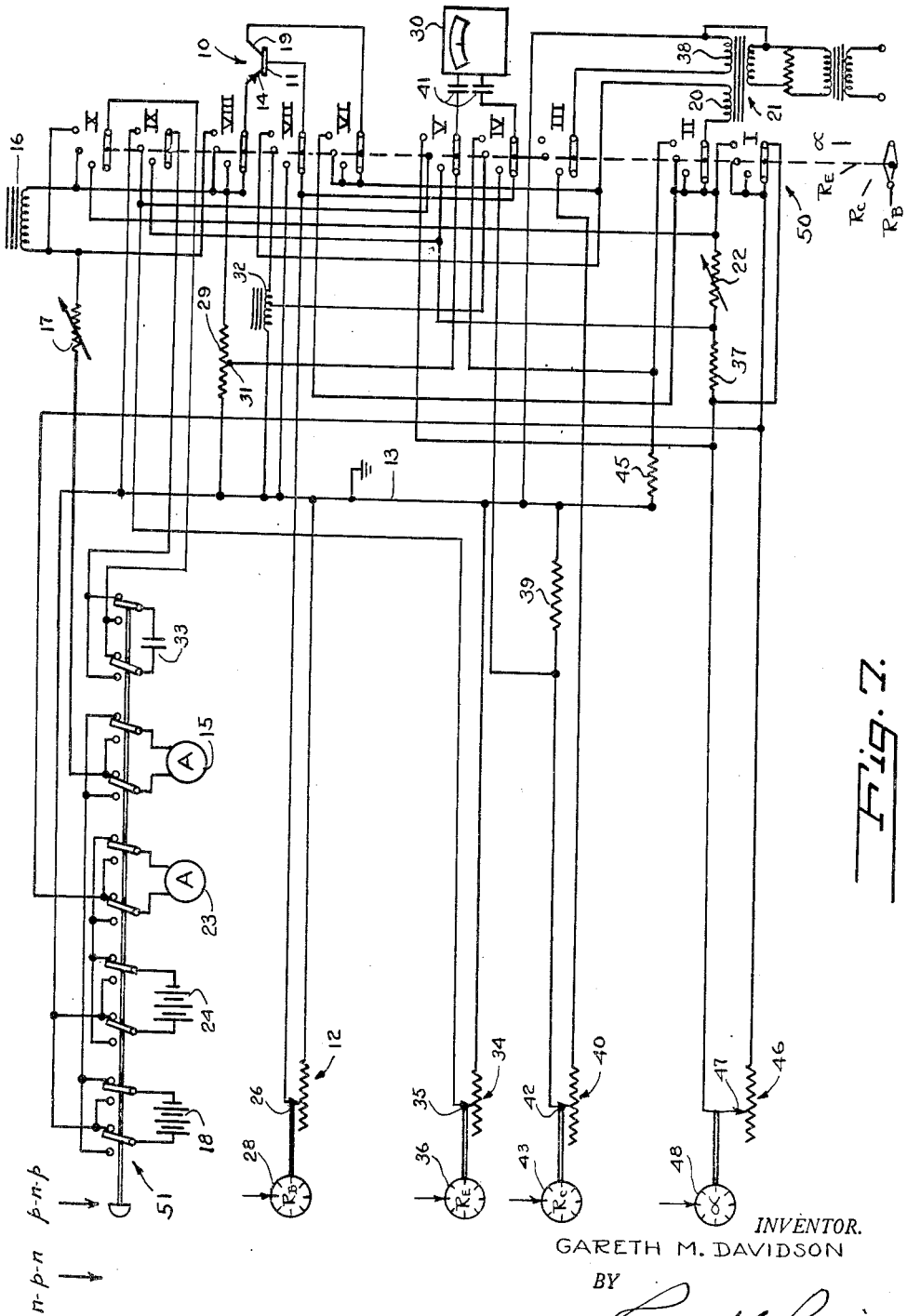

Jan. 29, 1957     G. M. DAVIDSON     2,779,922
TRANSISTOR TEST SET

Filed July 20, 1953     3 Sheets-Sheet 3

INVENTOR.
GARETH M. DAVIDSON
BY
*Raymond A. Paquin*
ATTORNEY.

United States Patent Office 2,779,922
Patented Jan. 29, 1957

2,779,922
TRANSISTOR TEST SET

Gareth M. Davidson, Bronx, N. Y., assignor to American Bosch Arma Corporation

Application July 20, 1953, Serial No. 369,088

9 Claims. (Cl. 324—158)

The present invention relates to electrical testing apparatus and has particular reference to means for determining the parameters of junction type transistors.

Present day manufacture of transistors has not yet reached the standardization required for non-selective assembly of apparatus employing transistors. It is necessary that the parameters of emitter, base and collector resistances and the amplification factor of each transistor be accurately and easily determined.

With this invention these four parameters can be determined with a minimum of apparatus and with an accuracy as high as desired. Even low precision inexpensive components will yield acceptable accuracy whereas higher accuracy can be obtained where needed by using high precision components. The resistance measurements are based on the equivalent circuit of a transistor which is a T network containing resistors $r_e$, $r_c$, and $r_b$ which are respectively, the emitter, collector and base resistances and a series generator in the collector circuit. Of these, the $r_e$ and $r_b$ are relatively low resistances and $r_c$ is extremely high. If the transistor is connected in a grounded base or grounded emitter circuit, so that the base or emitter resistance is the shunt arm, and a signal is applied between the collector and the ground a signal proportional to the value of the shunt arm resistance is obtained at the remaining pair of terminals, providing these terminals are open. By adding an external resistance into the shunt arm of value such that the output voltage is doubled, the added external resistance will be substantially equal to the internal resistance being measured, i. e. the base or the emitter resistance.

The collector resistance, however, is large and cannot be measured with accuracy in this manner. Instead, a circuit containing a variable resistance and a fixed resistance proportional to a fixed resistance in the collector circuit is energized with a signal proportional to that applied to the collector circuit. The voltages across the fixed resistors are compared and the variable resistor is adjusted until the compared voltages are equal. The variable collector resistance is then substantially proportional to the value of the collector resistance, and the proportionality factor is dependent on the relative values of the fixed resistors and the signal voltages.

The current amplification factor $\alpha$ is a value very close to, but less than unity, usually lying between 0.90 and 1.0. The important ratio in design of transistor circuits, however, is the gain in a grounded emitter transistor which is equal to $$\frac{\alpha}{1-\alpha}$$

and it will be seen that a slight error $\alpha$ will result in a large error in gain calculation. For this reason then the instrument of this invention is constructed to determine according to the gain in a grounded emitter transistor. Thus, in a grounded emitter circuit, a signal is applied to the base of the transistor and the voltage appearing across a fixed resistor in the base circuit is compared with the voltage across a variable resistor connected between the collector and ground. The variable resistor is adjusted until the voltages are equal. At this point the ratio of the fixed to the variable resistor is proportional to the gain, $$\frac{\alpha}{1-\alpha}$$

and the value of $\alpha$ can be mathematically determined therefrom.

All of the methods described are combined into one instrument which may be adapted for field use by employing battery power supplies, for speedy inspection by providing servo mechanisms for automatic balancing, for laboratory use by employing high precision components, all within the spirit of the invention.

For a better understanding of the invention, reference may be had to the accompanying diagrams in which:

Figure 1 is a schematic diagram of one circuit for determining the base resistance;

Figure 2 shows the accepted equivalent T network of a transistor;

Figure 3 is a schematic diagram of an alternative circuit for determining the base resistance;

Figure 4 is a schematic diagram of the circuit for determining the emitter resistance;

Figure 5 is a schematic diagram of the circuit for determining the collector resistance;

Figure 6 is a schematic diagram of the circuit for determining the current amplification factor;

Figure 7 is a schematic diagram of an instrument containing the circuits shown in Figures 3, 4, 5 and 6.

Figure 8:
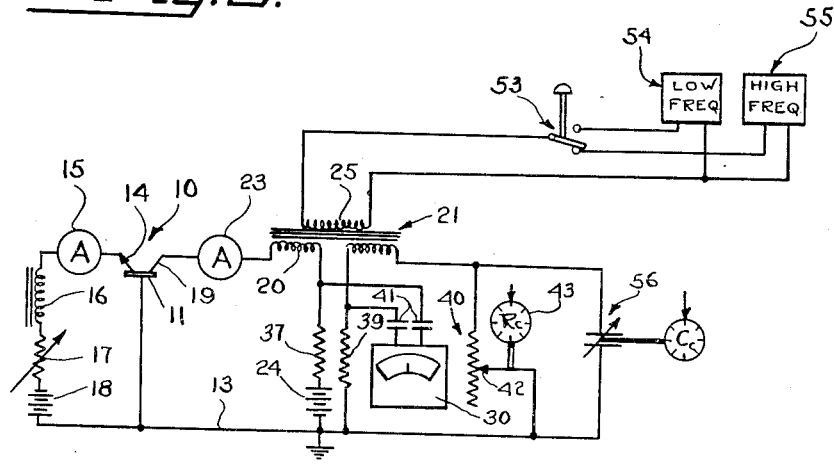
Figure 8 shows a modification of the arrangement shown in Figure 5, for the purpose of measuring the collector capacitance.

Referring now to Figure 1 of the drawings, the circuit for measurement of the base resistance, $r_b$, is shown. The transistor 10 is connected as a grounded base transistor where the base 11 is connected through a variable resistor 12 to the ground lead 13. The emitter 14 is connected through D. C. ammeter 15, choke 16 (having a high impedance to alternating current), resistor 17 and the emitter bias supply 18 to the ground lead 13. The collector 19 is connected through the secondary winding 20 of transformer 21, variable resistor 22, D. C. ammeter 23, the collector bias supply 24 to the ground lead 13. The polarities of the bias supplies 18 and 24 depend upon the type of transistor to be measured. Thus, in Figure 1, which shows an npn type of transistor, the emitter 14 is connected to the negative terminal while the collector 19 is connected to the positive terminal of the respective power supplies 18 and 24. For a pnp type of transistor the polarities of the bias supplies 18 and 24 would be reversed.

The ammeters 15 and 23 provide means for rough checking of the transistors. The direct current in each of the emitter and collector loops should be equal, and if any great difference exists, the transistor is defective.

It is known that the equivalent circuit of a grounded base transistor is a T network having series arms $r_e$ and $r_c$ and a shunt arm $r_b$ as shown in Figure 2, with a generator in the collector circuit supplying a voltage proportional to $Ai_e$, where $i_e$ is the emitter current and A is a function of the current amplification factor $\alpha$. It will be seen that in the measurements for $r_b$, $r_e$ and $r_c$ the emitter current is small so that the generator can be neglected in the equivalent circuit. When a signal is applied between the collector and ground a voltage will appear between the emitter and ground which is proportional to the shunt arm resistance, if the impedance between the emitter and ground is high. Thus, in the circuit of Figure 1, the primary winding 25 of transformer 21 is energized by a constant alternating voltage to produce an alternating current in the collector circuit.

The movable contact 26 of resistor 12 is initially set to zero and the A. C. voltage between emitter 14 and ground 13 as read on A. C. voltmeter 27 is recorded. The movable contact 26 is then adjusted until the voltmeter 27 indicates that the A. C. voltage between emitter 14 and ground 13 has doubled. At this point the value of external resistance between base 11 and ground 13 is equal to the base resistance. By proper calibration of the indicator 28 which is connected to the movable contact 26, the base resistance of the transistor 10 can be read directly from the indicator 28. The change in base current as the resistance 12 is increased is negligible since the resistance of the collector is extremely high, and the base resistance is small.

The variable resistors 17 and 22 provide means of varying the bias currents in the transistor, so that resistance measurements can be made at a number of operating conditions.

Figure 3 shows an alternative method for indicating that the resistance of resistor 12 is equal to that of the base resistance. The A. C. voltage across resistor 12 is compared with one-half of the A. C. voltage between emitter 14 and ground 13 and when the voltages are equal, the resistance of resistor 12 is equal to the base resistance. In order to effect this comparison, a voltage divider in the form of a high valued resistor 29 is connected between the emitter 14 and ground 13. A differential A. C. voltmeter 30 or null indicator is connected between the center tap 31 on resistor 29 and the base 11. Movable contact 26 is adjusted until the null meter 30 indicates zero, and at this point the base resistance can be read on the indicator 28.

The resistance voltage dividing resistor 29 may be eliminated by connecting the voltmeter to a center tap on winding 16, and bypassing the resistor 17 with a capacitor if desired.

Figure 10:
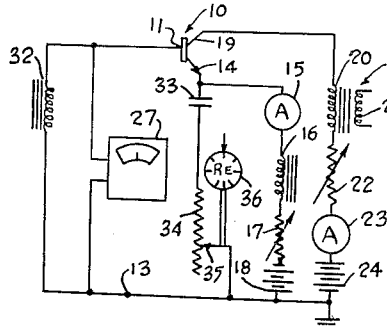
Fig. 10 is a view showing an arrangement generally similar to that of Fig. 4 but with the meter arrangement of Fig. 1.

In a substantially similar manner the emitter resistance, $r_e$, can be measured. Figure 4 shows the null meter connection, although the first described method can be used equally as well, as shown in Fig. 10. In Figure 4, the base 11 is connected to the ground 13 through a high valued A. C. impedance or choke 32, while the emitter 14 is connected to the ground 13 through a capacitor 33 and variable resistor 34 as well as through the circuit through ammeter 15, choke 16, resistor 17 and bias supply 18. The collector circuit is the same as in Figures 1 and 2.

The resistance voltage divider 29 is connected between the base 11 and ground 13, and a null meter 30 is connected to the center tap 31 of resistor 29 and to the junction between capacitor 33 and resistor 34. Alternatively the null meter 30 may be connected to a center tap on the winding of choke 32 instead of separate voltage divider, if convenient. The movable contact of resistor 34 is adjusted until the voltmeter 30 reads zero. At this point the A. C. voltage across resistor 34 is equal to one-half the A. C. voltage between the base 11 and ground 13, and the value of the resistor 34 is equal to the emitter resistance. The emitter resistance can be read directly from the properly calibrated indicator 36 which is connected to the movable contact 35.

The capacitor 33 presents a low impedance to alternating current and prevents the low valued resistor 34 from shunting the bias supply 18. The choke 16 presents a high valued impedance so that substantially all of the alternating current flows through the resistor 34.

The collector resistance, $r_c$, is a large resistance and may be of the order of several megohms. The method of Figures 1, 3 and 4 is therefore not suitable for measurement of $r_c$, and the circuit shown in Figure 5 is used. The transistor 10 is connected into a grounded base circuit where base 11 is connected directly to the ground lead 13, emitter 14 is connected as in Figures 1 and 2 through the ammeter 15, choke 16, resistor 17 and bias supply 18 to the ground 13 and the collector 19 is connected through secondary winding 20, ammeter 23, parallel connected resistor 22 and capacitor 33, fixed resistor 37 and bias supply 24 to the ground 13. Another secondary winding 38 of transformer 21 is connected in series with fixed resistor 39 and variable resistor 40. The junction of resistors 39 and 40 is connected to the ground lead 13 and the null meter 30 is connected across the resistors 37 and 39. Capacitors 41 are interposed in the connection to the null meter 30 to exclude direct current from the meter.

The signal voltages at secondary windings 20 and 38 are equal and may be expressed as E. Then the voltage across resistor 37 is equal to $$E \times \frac{R}{R+r_b+r_c} \tag{1}$$

where R is the value of resistor 37 and $r_b$ and $r_c$ are respectively the base and collector resistances of transistor 10. The resistance 22 is bypassed by capacitor 33 at the signal frequency and need not be included in Equation 1. Also the voltage across resistor 39 is equal to $$E \times \frac{R}{R_1+R_2} \tag{2}$$

where $R_1$ is the value of resistor 39 and $R_2$ is the value of resistor 40. Resistor 40 is adjusted until the voltages are equal, i. e. until null meter 30 reads zero, so that $$E \times \frac{R}{R+r_b+r_c} = E \frac{R}{R_1+R_2} \tag{3}$$

or $$RR_1 + RR_2 = RR_1 + R_1(r_b+r_c) \tag{4}$$

$$R_2 = (r_b+r_c) = \frac{R_1}{R}$$

or $$(r_b+r_c) = \frac{R}{R_1} R_2 \tag{5}$$

Equation 5 shows that at the null condition the value of resistance $R_2$ is proportional to $r_b+r_c$, and that the proportionality factor is dependent on the relative values of resistors 39 and 37.

The ratio of the resistors 39 and 37 is chosen so that a convenient valued variable resistor 40 may be used. For example, the ratio of $$\frac{R}{R_1}$$

is chosen to be equal to ten so that the value of $r_b+r_c$ is found according to the equation $$r_b+r_c = 10R_2$$

Since $r_c$ is of the order of several megohms the value of $R_2$ may be one-half of one megohm, maximum.

The indicator 43 which is connected to the movable contact 42 of the resistor 40 is calibrated to read the value of $r_c+r_b$ directly. Having previously found $r_b$ independently, the value of $r_c$ can be found by subtraction.

In practice it is found that $r_b$ is very much smaller than $r_c$ and the indicator 43 may be considered to read $r_c$ with sufficient accuracy.

The current amplification factor, $\alpha$, is measured in the circuit shown in Figure 6. It is known that if the collector lead in a grounded emitter transistor is shorted to ground the ratio of the A. C. current in the collector to the A. C. current in the base is given by the ratio $$\frac{i_c}{i_b} = \frac{\alpha}{1-\alpha} \tag{6}$$

Since α is very close to unity the ratio $$\frac{i_c}{i_b}$$

is sometimes given simply as $$\frac{1}{1-\alpha}$$

It will be seen that α must be very accurately determined to keep the error in circuit analysis small. On the other hand, the important value is $$\frac{\alpha}{1-\alpha}$$

and this ratio can be determined directly without precision apparatus.

Thus, in Figure 6, a grounded emitter transistor 10 is constructed by connecting the emitter to ground through the capacitor 33. The emitter bias current is available from the emitter bias supply 18 through the resistor 17. The base 11 is connected to ground 13 through the series connected secondary winding 20 of transformer 21 and the fixed resistor 45. The collector 19 is connected to ground 13 through the variable resistor 46, ammeter 23 and the collector bias supply 24. The variable resistor 46 is a relatively low value so that the relationship of Equation 6 is assumed to hold true.

The null meter 30 is connected to compare the A. C. voltage across resistor 45 and resistor 46, and the movable contact 47 of resistor 46 is adjusted until the null meter indicates zero. At this point $$i_b R_3 = i_c R_4 \qquad (7)$$

where $R_3$ and $R_4$ are the values of resistors 45 and 46 respectively. From 7 and 6 it is found that $$\frac{i_c}{i_b} = \frac{\alpha}{1-\alpha} = \frac{R_3}{R_4} \qquad (8)$$

Since resistance $R_3$ is fixed, the value of the ratio $$\frac{\alpha}{1-\alpha}$$

can be determined from the value of $R_4$. The indicator 48 which is connected to movable contact 47 of resistor 46 is calibrated to read α directly, which is seen to be equal to $$\frac{1}{1+\frac{R_4}{R_3}}$$

from Equation 8.

Preferably the four circuits shown in Figures 3, 4, 5, 6 are all combined in one instrument in which the particular test desired can be chosen by manipulation of a selector switch. Figure 7 shows one example of such an instrument although any number of similar circuits can be devised by those skilled in the art.

The circuits in Figure 7 are changed by the four position multiple gang selector switch 50. In this particular switch there are nine decks or ganged switches which perform the following functions: deck I selects the collector loop components, either variable resistor 22 and resistor 37 or variable resistor 46, deck II connects the secondary winding 20 into either the collector or base circuits, deck III completes the circuit through secondary winding 38, decks IV and V select the voltmeter 30 connections, deck VI changes the collector connections, deck VII changes the base connections, deck VIII changes the emitter bias connections and decks IX and X change the connections to the bypass capacitor 33.

Thus with selector switch 50 in the first position the circuit of the instrument corresponds to that of Figure 3, in which the collector bias resistance is composed of both resistor 22 and fixed resistor 37, however.

The reversing switch 51 is a multiple pole double throw switch which is operated to the right in Figure 7 when testing a pnp type transistor and to the left when testing on npn type transistor. The switch 51 reverses the connections to the bias power supplies 18 and 24, ammeters 15 and 23 and the bypass condenser 33, which is a polarized, high-capacity condenser.

With the selector switch 50 in position 2, the circuit is connected to measure $r_c$ according to the method shown in Figure 5. Although the voltage divider 29 remains connected between emitter and ground, its value is high and, therefore, will not affect the accuracy of the result.

With the selector switch 50 in the third position, the circuit is connected to measure $r_e$, the emitter resistors, according to the circuit shown in Figure 4, except that the voltage divider 29 is not connected and the voltmeter 30 is connected to the center tap on the winding of choke 32 instead.

With the selector switch 50 in the fourth position the instrument is connected as in Figure 6 to measure the amplification factor α.

The circuit of Figure 8 is a modification of the circuit of Figure 5 and includes means for measuring the collector capacitance $C_c$ which in the equivalent circuit is connected across the collector resistance $r_c$ and the current generator. At low frequencies, the reactance of the capacitance is very large so that the impedance of the parallel circuit is substantially $r_c$. At higher frequencies, however, the reactance of the capacitance compares with resistance $r_c$ and is significant at these higher frequencies.

Switch 53 is adapted to connect the primary winding 25 of transformer 21 to either a low frequency supply 54 having a frequency at which the impedance of the capacitor $C_c$ is high compared to $r_c$ or to a high frequency supply 55 having a frequency at which the impedance of the capacitor $C_c$ is comparable to that of $r_c$. Typical values of the frequencies might be 60 cycles/second for the low frequency and 4000 cycles/second for the high frequency. When switch 53 connects the winding 25 to the low frequency supply 54, the circuit of Figure 8 operates in the manner of Figure 5 where resistance 40 is adjusted until meter 30 reads zero and the resistance 40 is then proportional to $r_c + r_b$, or is substantially proportional to $r_c$. The variable capacitor 56 connected across resistor 40 has a high impedance and will not affect the $r_c$ measurement appreciably.

When switch 53 is positioned to connect the winding 25 to the high frequency supply, the circuit is used to measure $l_c$. The resistor 40 is left as it was during the low frequency adjustment, e. g. proportional to $r_c$, it will be seen that the mill meter 30 will not read zero. The variable capacitor 56 is, therefore, adjusted until the meter 30 again reads zero, and the value of capacitance in the variable capacitor 56 is then proportional to $C_c$, the collector capacitance. The ratio of proportionality is, as in Fig. 5, $$\frac{R}{R_1}$$

A dial 57 is affixed to the adjusting shaft of capacitor 56 which may be calibrated to read E directly.

Figure 9:
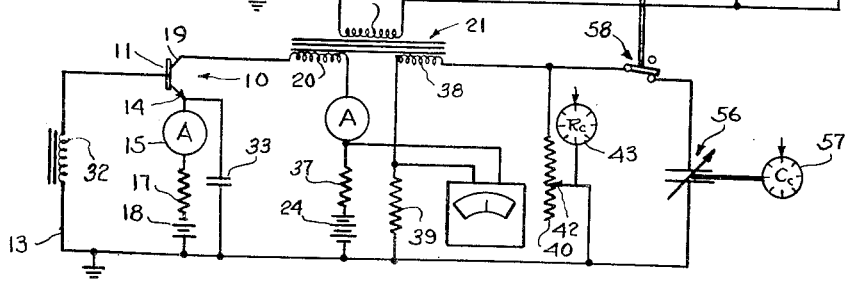
Figure 9 is a modification of the arrangement of Figure 8, using a grounded emitter connection.

Although both Figures 5 and 8 show the measurements of $r_c$ being accomplished in a grounded base transistor, a grounded emitter connection can be used as well. Figure 9 shows this connection for completeness and is a modification of the circuit in Figure 8.

The emitter 14 is connected to ground 13 through ammeter 15, resistor 17 and bias supply 18, all of which are shunted by the capacitor 33. The base 11 is connected to ground 13 through the high impedance choke 32. The capacitor 33 being of high capacity provides a small impedance path for the A. C. signal and does not affect the accuracy of the measurement. Swith 58, which acts with switch 53, may be provided to connect the variable capacitance 56 during the high frequency measurements and to disconnect the variable capacitance during low frequency measurements if desired.

It will be seen that the circuit of Figure 9 operates similarly to that of Figure 8 and that resistor 40 will be proportional to $r_c$ which capacitance 56 will be proportional to $C_c$ upon balancing the circuits as described previously.

I claim:

1. In a test set for determining the base resistance of a transistor, means for connecting the test transistor in a grounded base circuit, a variable resistor interposed between the ground and the base, means for supplying bias currents in the emitter and collector circuits, means for introducing an alternating voltage signal into the collector circuit, means for comparing the voltage across said variable resistor with a portion of the emitter voltage, and indicator means connected to said circuit for indicating the base resistance of said transistor.

2. In a test set for determining the emitter resistance of a transistor, means for connecting the test transistor in a grounded emitter circuit, a variable resistor interposed between the ground and the emitter, means for supplying bias currents in the emitter and collector circuits, means for introducing an alternating voltage signal into the collector circuit, means for comparing the voltage across said variable resistor with a portion of the base voltage, and indicator means connected to said circuit.

3. In a test set for determining the base resistance of a transistor, means for connecting the test transistor in a grounded base circuit, a variable resistor interposed between the ground and the base, means for supplying bias currents in the emitter and collector circuits, means for introducing an alternating voltage signal into the collector circuit, means for comparing the emitter voltage with the emitter voltage when the variable resistance is zero, and indicator means connected to said circuit.

4. In a test set for determining the emitter resistance of a transistor, means for connecting the test transistor in a grounded emitter circuit, a variable resistor interposed between the ground and the emitter, means for supplying bias currents in the emitter and collector circuits, means for introducing an alternating voltage signal into the collector circuit, means for comparing the base voltage with the base voltage when the variable resistance is zero, and indicator means connected to said circuit.

5. In a test set for measuring the collector resistance of a transistor, means for connecting the test transistor into a grounded base circuit, bias supplies for the emitter and collector circuits, a transformer having a primary winding and two secondary windings, one of said secondary windings and a fixed resistor interposed in the connections between the collector and ground, a circuit containing a second fixed resistor and a variable resistor connected across the other secondary winding, series connections between said fixed resistors, a voltmeter connected across the fixed resistors and indicating means for indicating the collector resistance of a transistor.

6. In a test set for measuring the current amplication factor of a transistor, means for connecting the transistor in a grounded emitter circuit, means for supplying bias currents in the emitter and collector circuits, means for introducing an alternating signal between base and ground, a fixed resistor included in the connections between the base and ground, a variable resistance between the collector and ground, means for comparing the voltages across the fixed and variable resistors, indicating means for indicating the current amplification factor of a transistor.

7. In a test set for measuring the collector resistance of a transistor having three electrodes known as the collector, emitter and base, a transformer having an energized primary winding and a pair of secondary windings, one of said secondary windings and a fixed resistor connected between said collector and a common ground, a high A. C. impedance between one of the remaining of said electrodes and said ground, a low A. C. impedance between the other of the remaining of said electrodes and said ground, bias supplies for the emitter and collector, a circuit containing a second fixed resistor and a calibrated variable resistor connected in series across the other secondary winding, series connections between said fixed resistors, comparator means connected across said fixed resistors, and indicating means connected to said circuit.

8. In a test set for measuring the collector capacitance of a transistor having three electrodes known as the collector, emitter and base, a transformer having an energized primary winding and a pair of secondary windings, one of said secondary windings and a fixed resistor connected between said collector and a common ground, a high A. C. impedance between one of the remaining of said electrodes and said ground, a low A. C. impedance between the other of the remaining of said electrodes and said ground, bias supplies for the emitter and collector, a circuit containing a second fixed resistor and a parallel circuit including a resistor and a calibrated variable capacitor connected in series across the other secondary winding, series connections between said fixed resistors, comparator means connected across said fixed resistors, and indicating means for indicating the collector capacitance of a transistor.

9. In a transistor test set, means for determining the base resistance, emitter resistance, collector resistance and amplification factor of a test transistor, said means for determining the base resistance comprising means for connecting the test transistor in a grounded base circuit, a variable resistor interposed between the ground and the base, means for supplying bias currents in the emitter and collector circuits, means for introducing an alternating voltage signal into the collector circuit, means for comparing the voltage across said variable resistor with a portion of the emitter voltage and indicator means connected to said circuit, said means for determining the emitter resistance comprising means for connecting the test transistor in a grounded emitter circuit, a variable resistor interposed between the ground and the emitter, means for supplying bias currents in the emitter and collector circuits, means for introducing an alternating voltage signal into the collector circuit, means for comparing the voltage across said variable resistor with a portion of the base voltage and indicator means connected to said circuit, said means for determining the collector resistance of a transistor comprising means for connecting the test transistor into a grounded base circuit, bias supplied for the emitter and collector circuits, a transformer having a primary winding and two secondary windings, one of said secondary windings and a fixed resistor interposed in the connections between the collector and ground, a circuit containing a second fixed resistor and a variable resistor connected across the other secondary winding, series connections between said fixed resistors, said means for determining the current amplification factor comprising means for connecting the transistor in a grounded emitter circuit, means for supplying bias currents in the emitter and collector circuits, means for introducing an alternating signal between base and ground, a fixed resistor included in the connections between the base and ground, a variable resistance between the collector and ground, means for comparing the voltages across the fixed and variable resistors and indicating means connected to said circuit.

References Cited in the file of this patent

"Production Tester For Transistors," Hunter et al., Electronics, October 1950, pages 96–99.

"Transistor Characteristics At Low and Medium Frequencies," Giacoletto, Tele-Tech & Electronic Industries, March 1953, pages 97–99, 150, 151, 157.